Patented Jan. 19, 1937

2,068,373

UNITED STATES PATENT OFFICE 2,068,373

PROCESS FOR PREPARING DIAMINO-DI-PHENOXY-ANTHRAQUINONE DISULPHONIC ACIDS

Edwin C. Buxbaum, Shorewood, Wis., assignor to E. I. du Pont de Nemours & Company, Wilmington, Del., a corporation of Delaware No Drawing. Application May 20, 1936, Serial No. 80,807

9 Claims. (Cl. 260—59)

This invention relates to an improvement in the process for preparing 1,4-diamino-2,3-diphenoxy-anthraquinone disulphonic acids and more particularly in their isolation from the sulphonation mass in a highly pure form.

In the preparation of sulphonic acid derivatives of arylamino- or aryloxy-anthraquinones, the separation of the sulphonic acid compounds from the sulphonation mass is ordinarily effected either by drowning the mass in water to precipitate the free sulphonic acids as such in those cases where they are relatively water insoluble, or by salting them from the dilute acid solution as the alkali metal salts. Where the compounds, particularly the disulphonic acids of diarylamino-anthraquinones, are precipitated in an amorphous or gelatinous form by the salting procedure the precipitate can be put in a more crystalline form by prolonged heating in the dilute acid solution, and even these more soluble compounds can thereby be obtained in relatively pure form and in good yields.

In the sulphonation of 1,4-diamino-2,3-diphenoxy-anthraquinones it is found that when the sulphonation mass is poured into the water the resulting sulphonic acids are too soluble to be separated. On attempting to salt the product out of the solution the alkali metal salts of the sulphonic acids are precipitated in a tarry or gelatinous form which is difficult or impossible to filter and which carries down with it a large amount of impurities. Continued heating of this solution does not convert it to a crystalline form from which the impurities may be separated, and purification of the product so obtained is difficult and involves a material loss of the desired color. I have found that the 1,4-diamino-2,3-diphenoxy-anthraquinone disulphonic acids may be readily separated from the sulphonation mass by carefully adjusting the acidity of the sulphonation mass to a point where the sulphate of the amine compound is formed, and then filtering. The amine sulphate precipitates in a highly crystalline form which filters readily and from which the impurities may be separated by washing with dilute acids, water or salt solution. The amine sulphate can be converted to the free amine or to the alkali metal salt of the sulphonic acid by washing with an alkali metal salt solution.

The amine sulphate separates out of the sulphuric acid solution when the acid concentration is brought to from 45 to 65%. Where the acid concentration is reduced to less than 45% the sulphonic acids precipitate in a tarry mass; at still lower concentrations (10 to 20%) they precipitate as a gel from which the pure disulphonic acids can be obtained only with difficulty. Where an acid concentration of over 65% is maintained, a lower yield of the desired dyestuff results. Where the concentrated sulphuric acid mass is poured into only sufficient water to bring the acid concentration of the mass to approximately 50%, the temperature attained is optimum for filtration of the mass, giving crystals which filter rapidly and from which impurities are easily separated by washing.

The dyestuff obtained by this improved process dyes wool in very bright red violet shades, while the product obtained by salting out the desired color from the sulphonation mass dyes in duller and redder shades than the purer 1,4-diamino-2,3-diphenoxy-anthraquinone disulphonic acid. In the salting procedure the color also retains a high percentage of inorganic salts from which it can be separated only with difficulty, while according to my improved procedure the color can be obtained in practically pure form as the free acid which in turn can be converted to the alkali metal salt by the addition of theoretical quantities of alkali.

The following examples are given to more fully illustrate my invention. The parts used are by weight.

*Example 1*

Two hundred parts of 1,4-diamino-2,3-diphenoxy-anthraquinone are added slowly to 2,000 parts of sulphuric acid monohydrate until the base is completely dissolved. The solution is then stirred for one-half hour at room temperature or until one drop of the sulphonation mass in 10 cc. of cold water shows complete solubility. The sulphonation mass is then poured into a mixture of 1,500 parts of water and 500 parts of ice and agitated. The temperature attained is between 50 and 60° C. and a brown crystalline mass separates out. The crystalline suspension is filtered immediately and washed with 400 parts of 50% sulphuric acid. The acid cake is then washed acid free and converted to the sodium salt of the sulphonic acid, using 10% brine solution. It is then dried at 100° C. The resulting product is a reddish brown crystalline solid which dissolves easily in water with a red violet shade.

*Example 2*

One hundred parts of 1,4-diamino-2,3-diphenoxy-anthraquinone are dissolved in 1000 parts of sulphuric acid monohydrate and held at room temperature until sulphonation is complete. The reaction mass is then poured into 750 parts of water and 250 parts of ice, and the resulting crystalline suspension is then immediately filtered and washed with 200 parts of 50% sulphuric acid. The crystalline residue is then further washed with 400 parts of concentrated hydrochloric acid until free from sulphuric acid, and then dried at 100° C. The resulting product is the sulphate of 1,4-diamino-2,3-diphenoxy-anthraquinone sulphonic acid. The product may be hydrolyzed and converted to the alkali metal salt by washing with an alkali metal carbonate solution.

*Example 3*

One hundred parts of 1,4-diamino-2,3-diphenoxy-anthraquinone are added to 1000 parts of sulphuric acid, 93%, and agitated until the base is entirely in solution. The sulphonation mixture is then heated to 60–70° C. until sulphonation is complete. The reaction mass is then poured into a mixture of 750 parts of water and 250 parts of ice, stirred for one-half hour and filtered. The crystalline cake is washed acid free with brine and dried at 100° C.

*Example 4*

One hundred parts of 1,4-diamino-2,3-di-(p-methyl-phenoxy)-anthraquinone are dissolved in 1000 parts of sulphuric acid monohydrate at room temperature. When all the base is in solution, the agitation is continued for one hour or until sulphonation is complete. The sulphonation mass is then poured into a mixture of 750 parts of ice and 250 parts of water. An orange crystalline sulphonation product is formed which is filtered and washed acid free with 10% brine. The sulphonated product so obtained dyes wool a bright red violet.

This improved process is particularly adapted for separating the disulphonic acids of diphenoxy-diamino-anthraquinone from the sulphonation mass, and is applicable not only to the 1,4-diamino-2,3-diphenoxy-anthraquinone disulphonic acid but to the separation of its homologues, such as the 1,4-diamino-2,3-di(ortho-, meta- or para-methyl-phenoxy)-anthraquinone disulphonic acids, as illustrated above.

I claim:

1. In the process for isolating a 1,4-diamino-2,3-diphenoxy-anthraquinone disulphonic acid from its sulphonation mass, the step which comprises adjusting the sulphuric acid concentration of the mass to between 45 and 65%, to precipitate the sulphate of the 1,4-diamino-2,3-diphenoxy-anthraquinone disulphonic acid.

2. In the process for isolating a 1,4-diamino-2,3-diphenoxy-anthraquinone disulphonic acid from its sulphonation mass, the steps which comprise adjusting the sulphuric acid concentration of the mass to between 45 and 65%, to precipitate the sulphate of the 1,4-diamino-2,3-diphenoxy-anthraquinone disulphonic acid, and filtering the resulting suspension.

3. In the process for isolating a 1,4-diamino-2,3-diphenoxy-anthraquinone disulphonic acid from its sulphonation mass, the steps which comprise adjusting the sulphuric acid concentration of the mass to between 45 and 65%, to precipitate the sulphate of the 1,4-diamino-2,3-diphenoxy-anthraquinone disulphonic acid, filtering the resulting suspension and hydrolyzing the product to the free amine.

4. In the process for isolating a 1,4-diamino-2,3-diphenoxy-anthraquinone disulphonic acid from its sulphonation mass, the steps which comprise adjusting the sulphuric acid concentration of the mass to between 45 and 65%, to precipitate the sulphate of the 1,4-diamino-2,3-diphenoxy-anthraquinone disulphonic acid, filtering the resulting suspension, hydrolyzing and converting the product to the alkali metal salt of the sulphonic acid by treating the precipitate with an alkali metal salt solution.

5. In the process for isolating a 1,4-diamino-2,3-diphenoxy-anthraquinone disulphonic acid from its sulphonation mass, the step which comprises adjusting the sulphuric acid concentration of the mass to approximately 50%, to precipitate the sulphate of the 1,4-diamino-2,3-diphenoxy-anthraquinone disulphonic acid.

6. In the process for isolating a 1,4-diamino-2,3-diphenoxy-anthraquinone disulphonic acid from its sulphonation mass, the steps which comprise adjusting the sulphuric acid concentration of the mass to approximately 50%, to precipitate the sulphate of the 1,4-diamino-2,3-diphenoxy-anthraquinone disulphonic acid, and filtering the resulting suspension.

7. In the process for isolating a 1,4-diamino-2,3-diphenoxy-anthraquinone disulphonic acid from its sulphonation mass, the steps which comprise adjusting the sulphuric acid concentration of the mass to approximately 50%, to precipitate the sulphate of the 1,4-diamino-2,3-diphenoxy-anthraquinone disulphonic acid, filtering the resulting suspension and hydrolyzing the product to the free amine.

8. In the process for isolating a 1,4-diamino-2,3-diphenoxy-anthraquinone disulphonic acid from its sulphonation mass, the steps which comprise adjusting the sulphuric acid concentration of the mass to approximately 50%, to precipitate the sulphate of the 1,4-diamino-2,3-diphenoxy-anthraquinone disulphonic acid, filtering the resulting suspension, hydrolyzing and converting the product to the alkali metal salt of the sulphonic acid by treating the precipitate with an alkali metal salt solution.

9. In the process for preparing 1,4-diamino-2,3-diphenoxy-anthraquinone disulphonic acid, the steps which comprise sulphonating the 1,4-diamino-2,3-diphenoxy-anthraquinone by means of a concentrated sulphuric acid, diluting the sulphonation mass to a sulphuric acid concentration of from 45 to 65%, filtering off the sulphate of the diamine disulphonic acid which precipitates, and washing the resulting filtrate with concentrated hydrochloric acid to obtain a substantially pure sulphate of the 1,4-diamino-2,3-diphenoxy-anthraquinone disulphonic acid.

EDWIN C. BUXBAUM.